Nov. 22, 1927.　　　　　　　　　　　　　　　　　　1,650,257
V. BENDIX
BRAKE
Filed Sept. 1, 1926
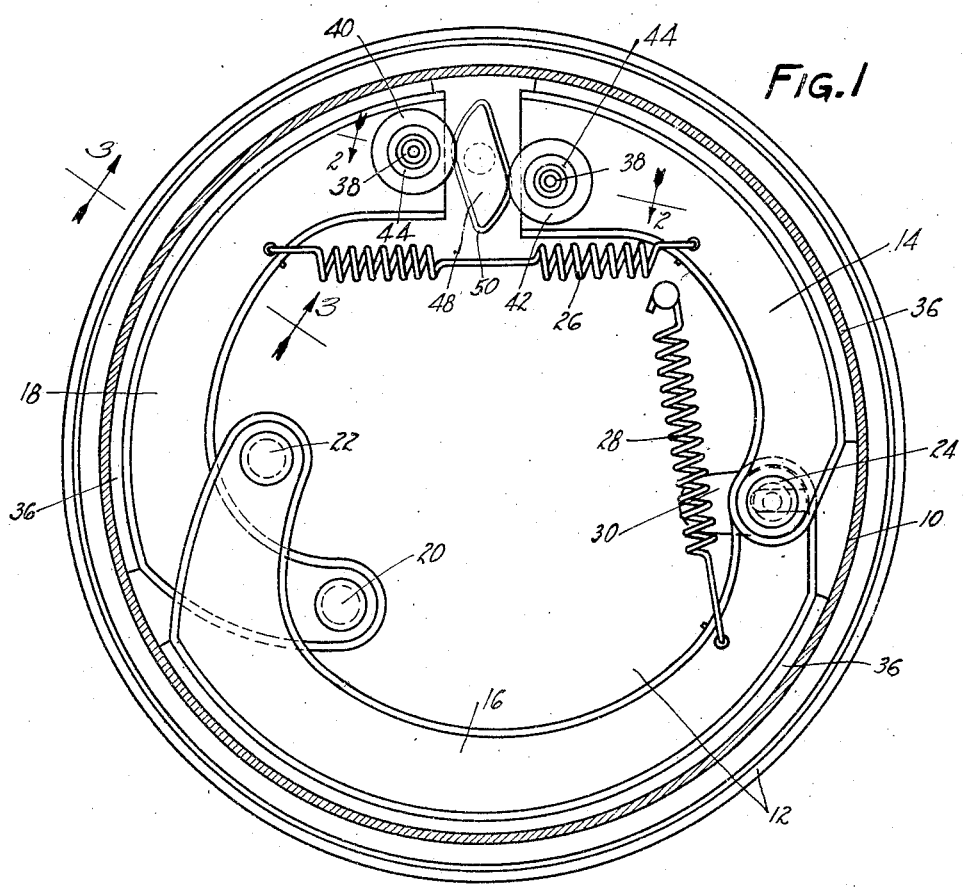
FIG.1
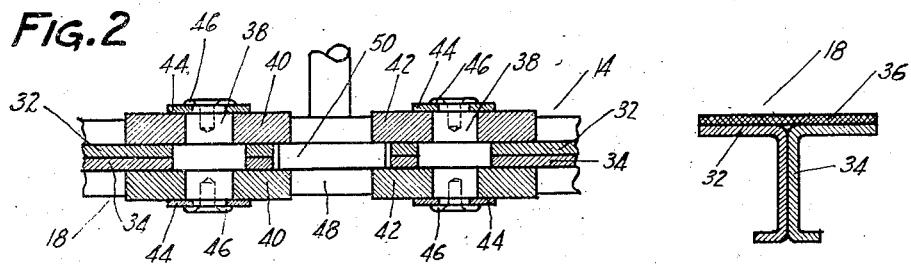
FIG.2
FIG.3.
INVENTOR
VINCENT BENDIX
BY
ATTORNEY Patented Nov. 22, 1927.

1,650,257

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE.

Application filed September 1, 1926. Serial No. 132,910.

This invention relates to brakes, and is illustrated as embodied in an internal expanding automobile brake. An object of the invention is to provide the shoes or their equivalents with novel rollers, to lessen the friction of the brake-applying means.

I prefer to arrange the rollers or sets of rollers to engage the cam or other thrust member on opposite sides of its axis, to give a thrust substantially tangential of the brake instead of a direct wedging action only. In one very desirable arrangement one part of the friction means is longer than the other, being illustrated as twice as long, and the distances between the roller axes and the cam axis are in proportion to the lengths of said parts.

An important feature of the invention relates to a novel roller mounting, the rollers preferably being arranged in pairs between which projects a rib or the like positioning the shoe end laterally.

The above and other objects and features of the invention, including various novel combinations of parts and desirable particular constructions, will be apparent from the following description of the illustrative constructions shown in the accompanying drawing, in which:

Figure 1 is a partial section through the brake just inside the head of the brake drum and showing the shoes in side elevation;

Figure 2 is a partial section on the line 2—2 of Figure 1 through the cam and the two sets of rollers; and Figure 3 is a section through one of the shoes on the line 3—3 of Figure 1.

The brake illustrated in the drawing includes a drum 10 rotating with a wheel (not shown) at the open side of which is arranged a suitable support such as a backing plate 12 and within which is arranged suitable friction means shown as including in this particular brake three shoes 14, 16, and 18. Shoe 18 is anchored on a pivot 20 carried by the backing plate 12, and shoe 16 is anchored on a pivot 22 also carried by the backing plate 12, while shoe 14 is connected to the unanchored end of shoe 16 by a floating pivot 24. The brake is applied by novel means, which is described below and which forms the general subject-matter of the present invention, and which acts to force the shoes 14 and 18 apart toward the drum against the resistance of a return spring 26, whereupon shoe 14 acts against the resistance of an auxiliary return spring 28 to force the shoe 16 outwardly toward the drum. When the brake is released, the spring 28 urges the shoe 16 away from the drum to an idle position determined by a stop 30 of any desired character. The particular shoes illustrated are built up of pairs of stampings 32 and 34, each of which is generally L-shaped in cross-section, and which are secured together back to back so that their inwardly-extending flanges form the curved friction face to which is riveted or otherwise secured any suitable brake lining 36.

According to an important feature of the present invention, the shoes 14 and 18 or the equivalent friction means of the brake are provided at their adjacent ends with novel rollers engaging a thrust member movable about an axis between said ends. In the arrangement illustrated in Figures 1 and 2, a pivot member 38 is carried by the stiffening web of each of the shoes at its free end, the pivots shown being provided with enlarged central portions or collars of the thickness of the stiffening web formed by the two flanges of the stampings and with parts of reduced diameter extending on opposite sides of the shoes and carrying rollers 40 and 42 which are spaced apart a distance equal to the thickness of the stiffening web and which project beyond the end of the stiffening web. The rollers 40 and 42 are prevented from displacement on the pivots 38 by means such as washers 44 held in place by peening or riveting over flanges 46 formed on the ends of the pivots.

I prefer to provide a brake-applying thrust member, shown as a double cam 48, with means such as a central rib 50 projecting between the pairs of rollers 40 and 42 to position laterally the free ends of the shoes 14 and 18.

Another feature of the invention relates to the positioning of the rollers 40 and 42, with respect to the axis about which the thrust member 48 is rocked in applying the brake. As best appears in Figure 1, the one set of rollers 42 is arranged with the roller axis on the side of the cam axis next the axis of the drum, whereas the other rollers 40 are arranged with their roller axis on the opposite side of the cam axis; that is, on the side next the outside of the drum. This arrangement insures that the thrust from the cam will be substantially tangential with respect to the drum. Where one part of the friction means, such as connected shoes 14 and 16, is longer than the other part, such as shoe 18, the distances of the roller axes from the cam axis radially of the drum should be in proportion to the lengths of the parts of the friction means. In the present instance, where the one part is twice as long as the other, the axis of rollers 42 should be approximately twice as far radially of the drum from the cam axis as is the axis of the rollers 40.

While one illustrative embodiment has been described in detail, it is not my intention to limit the scope of the invention to that particular embodiment or otherwise than by the terms of the appended claims.

I claim:

1. A brake comprising, in combination, a drum, a friction device engageable with the drum and having adjacent ends movable different distances in applying the brake, a thrust member movable about an axis between said ends, and rollers on said ends engaging the thrust member, one of the rollers engaging the thrust member between its axis and the drum, and the other roller engaging the thrust member between its axis and the axis of the drum, the leverage of the thrust member on said rollers being in proportion to the movement of the rollers in applying the brake.

2. A brake comprising, in combination, a drum, a friction device engageable with the drum and having adjacent ends movable different distances in applying the brake, a double cam movable about an axis between said ends, and rollers on said ends engaging the cam, one of the rollers engaging the cam between its axis and the outside of the drum, and the other roller engaging the cam between its axis and the axis of the drum, the leverage of the cam on the rollers being in proportion to the movement of the rollers in applying the brake.

3. A brake comprising, in combination, a drum, a friction device engageable with the drum and including parts of different lengths having adjacent ends, a thrust member movable about an axis between said ends, and rollers on said ends engaging the thrust member, the roller on one end engaging the thrust member on the side of its axis next the drum axis and the other on the opposite side of its axis from the drum axis, the distance radially of the drum between the axis of the thrust member and the axis of the roller on the longer part being greater than the distance between said thrust member axis and the axis of the roller on the shorter part.

4. A brake comprising, in combination, a drum, a friction device engageable with the drum and including parts one of which is approximately double the other in length and which have adjacent ends, a thrust member movable about an axis between said ends, and rollers on said ends engaging the thrust member, the roller on one end engaging the thrust member on the side of its axis next the drum axis and the other on the opposite side of its axis from the drum axis, the distance radially of the drum between the axis of the thrust member and the axis of the roller on the longer part being double the distance between said thrust member axis and the axis of the roller on the shorter part.

5. A brake shoe having a stiffening web at least at its end, and a pair or rollers mounted on opposite sides of said web.

6. A brake shoe having a stiffening web at least at its end, and a pair or rollers mounted on opposite sides of said web, in combination with a thrust member having a part projecting between said rollers to position the shoe laterally.

7. A brake shoe having a stiffening web at least at its end, and a pair of rollers mounted on opposite sides of said web, in combination with a cam having a central rib projecting between said rollers to position the shoe laterally.

8. A brake shoe including two flanges secured between the edges of the shoe to form a stiffening web, a pivot member carried by said flanges, and a roller mounted on the pivot member and transmitting brake-applying thrust to both of said flanges.

9. A brake shoe including two flanges secured between the edges of the shoe to form a stiffening web, a pivot member carried by and projecting on opposite sides of said flanges, and rollers mounted on the opposite projecting ends of the pivot member.

10. A brake shoe having a stiffening web, a pivot member carried by and projecting on opposite sides of said web, and rollers mounted on the opposite projecting ends of the pivot member.

11. A brake comprising, in combination, friction means having adjacent ends and having spaced pairs of rollers at its said ends, and a brake-applying thrust member having a part projecting between the two rollers of each pair of spaced rollers to position said ends laterally.

12. A brake comprising, in combination, friction means having adjacent ends and having spaced pairs of rollers at its said ends and a brake-applying double cam having a rib projecting between the two rollers of each pair of spaced rollers to position said ends laterally.

13. A brake comprising, in combination, a friction member having a roller, and a brake-applying member having a rib engaging the side face of the roller to prevent lateral movement of the friction member.

14. A brake comprising, in combination, a friction member having spaced rollers at its end, and a cam operatively engaging the rollers and interlocking with the rollers to prevent lateral movement of the friction member.

15. A brake comprising, in combination, a friction member, a brake-applying member, and a pair of spaced rollers carried by one of said members and having their edges engaged by the other member, said other member having a rib projecting between the rollers in such a manner as to cooperate with the rollers in positioning the friction member laterally.

16. A brake shoe having a stiffening web formed with an opening, and provided with a pivot member having a relatively large central section of the same thickness as said web and arranged in said opening and having smaller-diameter portions projecting on opposite sides of said web, in combination with rollers mounted on said smaller diameter portions and engaging the ends of the central section and the sides of said web to prevent axial movement of the pivot member, and means at the ends of said smaller-diameter portions restraining the rollers against axial movement.

In testimony whereof, I have hereunto signed my name.

VINCENT BENDIX.